United States Patent
Parsons

(10) Patent No.: US 12,492,006 B2
(45) Date of Patent: Dec. 9, 2025

(54) ENGINE CONTROL METHOD FOR ECONOMY MODE OPERATION

(71) Applicant: Textron Innovations Inc., Providence, RI (US)

(72) Inventor: Thomas Dewey Parsons, Ft. Worth, TX (US)

(73) Assignee: Textron Innovations Inc., Providence, RI (US)

( * ) Notice: Subject to any disclaimer, the term of this patent is extended or adjusted under 35 U.S.C. 154(b) by 66 days.

(21) Appl. No.: 18/632,957

(22) Filed: Apr. 11, 2024

(65) Prior Publication Data
US 2025/0319976 A1    Oct. 16, 2025

(51) Int. Cl.
*B64D 31/06* (2024.01)
*B64C 27/04* (2006.01)

(52) U.S. Cl.
CPC .............. *B64D 31/06* (2013.01); *B64C 27/04* (2013.01)

(58) Field of Classification Search
CPC ................................. B64D 31/06; B64C 27/04
See application file for complete search history.

(56) References Cited

U.S. PATENT DOCUMENTS

| | | | | |
|---|---|---|---|---|
| 2,533,484 A | * | 12/1950 | Lukaes | G09B 9/18 434/54 |
| 10,325,504 B2 | * | 6/2019 | Meier | B64D 43/02 |
| 11,167,845 B2 | * | 11/2021 | Schank | B64D 35/04 |
| 11,208,207 B2 | * | 12/2021 | Lloyd | B64C 11/001 |
| 11,299,289 B1 | * | 4/2022 | Derstein | B64D 43/02 |
| 11,448,561 B2 | * | 9/2022 | Hale | G01L 3/1435 |
| 11,898,500 B2 | * | 2/2024 | Parsons | F02C 7/262 |
| 11,975,828 B2 | * | 5/2024 | Covington | G01L 3/109 |
| 11,975,860 B2 | * | 5/2024 | Parsons | F02C 9/42 |
| 2009/0186320 A1 | * | 7/2009 | Rucci | G09B 9/08 434/33 |
| 2013/0219905 A1 | * | 8/2013 | Marconi | F02C 7/268 60/39.12 |
| 2016/0236790 A1 | * | 8/2016 | Knapp | B64D 27/24 |
| 2018/0080380 A1 | * | 3/2018 | Simonetti | B64D 35/08 |
| 2018/0237149 A1 | * | 8/2018 | Manoukian | B64D 45/0005 |
| 2018/0237153 A1 | * | 8/2018 | Manoukian | B64D 41/00 |
| 2018/0268722 A1 | * | 9/2018 | Meier | G01C 21/005 |

(Continued)

FOREIGN PATENT DOCUMENTS

| EP | 2635782 B1 | 7/2017 |
|---|---|---|
| EP | 3951150 A1 | 2/2022 |

*Primary Examiner* — Mussa A Shaawat
(74) *Attorney, Agent, or Firm* — Slater Matsil, LLP

(57) ABSTRACT

A method for operating an aircraft includes determining a shaft horse power requirement of a multi-engine power plant, comparing the shaft horse power requirement to a threshold value, and activating an economy mode of operation or inhibiting the economy mode of operation based upon the results of the comparison step. The threshold value may be determined from a power rating for an engine of the multi-engine power plant, and may be adjusted and/or delayed, depending upon whether the current state is economy mode active or economy mode inhibited. The shaft hose power requirement can be calculated from a control input, such as collective position, from a collection of flight parameters, including airspeed, aircraft gross weight, altitude, and the like, or from a measurement of actual shaft horse power production by the engines.

20 Claims, 11 Drawing Sheets

(56) References Cited

U.S. PATENT DOCUMENTS

| | | | | |
|---|---|---|---|---|
| 2019/0322379 A1* | 10/2019 | Mackin | ................. | F01D 17/162 |
| 2020/0165983 A1* | 5/2020 | Chahal | ................... | B64D 27/10 |
| 2020/0165984 A1* | 5/2020 | Chahal | ...................... | F02C 9/28 |
| 2020/0255159 A1* | 8/2020 | Manoukian | ............ | B64D 31/10 |
| 2020/0256265 A1* | 8/2020 | Manoukian | ............... | F02C 6/02 |
| 2020/0290742 A1* | 9/2020 | Kumar | ................... | B64D 27/35 |
| 2020/0362753 A1* | 11/2020 | Beauchesne-Martel | ..................... | B64C 27/06 |
| 2020/0362754 A1* | 11/2020 | Beauchesne-Martel | ..................... | F02C 6/02 |
| 2021/0108571 A1* | 4/2021 | Manoukian | ............... | F02C 6/08 |
| 2021/0245607 A1* | 8/2021 | Zhang | ....................... | G05F 1/66 |
| 2021/0247259 A1* | 8/2021 | Altieri | ..................... | G01L 3/101 |
| 2022/0106915 A1* | 4/2022 | Beauchesne-Martel | ..................... | B64D 31/00 |
| 2022/0306308 A1* | 9/2022 | Cerqueira | ............... | B64C 27/57 |
| 2022/0333535 A1* | 10/2022 | Chahal | ..................... | F02C 9/28 |
| 2023/0211876 A1* | 7/2023 | Parsons | ................... | B64C 27/06 244/76 R |
| 2024/0017823 A1* | 1/2024 | Parsons | ................... | B64C 27/12 |
| 2024/0083570 A1* | 3/2024 | Ramamurthy | ......... | B64D 27/24 |

* cited by examiner

ENGINE CONTROL METHOD FOR ECONOMY MODE OPERATION

STATEMENT REGARDING FEDERALLY SPONSORED RESEARCH OR DEVELOPMENT

Not applicable.

TECHNICAL FIELD

The present invention relates generally to a system and method for controlling economy mode operation, sometimes referred to herein as reduced-engine operation (REO) mode, of an aircraft. More specifically, the present invention relates to a system and method for determining whether flight conditions and/or aircraft conditions allow for entry into an economy mode, or REO mode, of operation of the aircraft.

DESCRIPTION OF RELATED ART

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Generally, redundancy of critical components, including engines, is a key safety design of commercial aircraft. It is recognized that fuel consumption of a multi-engine vehicle, such as a multi-engine aircraft, is reduced when fewer than all of the engines are in operation. Hence, fuel consumption performance can be improved by placing one or more engines of a multi-engine aircraft into an off state or at least a reduced operation state. In the aircraft industry, the desire for reduced fuel consumption must be carefully balanced against the need to ensure flight safety, however. The process of intentionally shutting down engines is, in many respects, contrary to the goals and intentions of designed-in redundancy. It is for this reason that some practitioners in the art have focused on systems and methods for rapidly restarting an engine that has been placed into an off or a reduced operation state. What is needed in the art, then, is improved systems and methods for determining optimum conditions for entering into an economy mode of operation wherein one or more engines are placed into an off state or some other reduced operation state.

SUMMARY

In accordance with a preferred embodiment of the present invention, a method for controlling a multi-engine aircraft capable of operating in an economy mode and a full operational mode comprises determining a current state of the aircraft. In response to determining the aircraft is in the full operational mode, the method includes comparing the SHP requirement to a first threshold value, and allowing the aircraft to enter the economy mode of operation when the SHP requirement is below the first threshold value, and inhibiting the aircraft from entering the economy mode of operation when the SHP value is above the first threshold value. In response to determining the aircraft is in the economy mode, the method further includes comparing the SHP requirement to a second threshold value, and allowing the aircraft to remain in economy mode of operation when the SHP requirement is below the second threshold value, and inhibiting the aircraft from remaining in economy mode when the SHP requirement is above the second threshold value. In addition, the method includes placing at least one engine of the aircraft in a reduced operation mode in response to the aircraft entering into the economy mode, and transitioning at least one engine of the aircraft from the reduced operation mode to a full operational mode in response to the aircraft being inhibited from remaining in the economy mode. Embodiments include an aircraft configured to perform the method.

An advantage of a preferred embodiment of the present invention is improved fuel consumption performance of the aircraft.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Throughout the following description, embodiments will be discussed wherein an aircraft has two engines, one of which may be put into a reduced operational mode to reduce fuel consumption. One should recognize, however, that the following disclosure can apply equally to aircraft having more than two engines, whereby one or more engines can be placed into a reduced operational mode. While two-engine aircraft in which one engine is put into reduced operational mode are disclosed as specific examples, this disclosure is intended to be broadly construed to any embodiment involving an aircraft having a total of N engines wherein up to N−1 of the engines may be placed in a reduced operational mode for purposes of reducing fuel consumption. Additionally, in the specific embodiments herein, a rotorcraft is illustrated as an example. One skilled in the art, however, will recognize that the teaching of the present disclosure can be applied to other aircraft as well, including fixed-wing aircraft, remotely-operated or autonomous drones, tiltrotor/tiltwing aircraft, and the like.

The term reduced operational mode as used herein, unless required by the context in which the term is used, is intended to encompass a state in which the engine is placed in a state whereby its power output, and also its fuel consumption, is substantially reduced and/or reduced entirely. As such, the term encompasses an engine that is turned off, is placed in an idle mode or a sub-idle mode, or a similar mode in which power output, and hence fuel consumption is substantially reduced.

Figure 1:
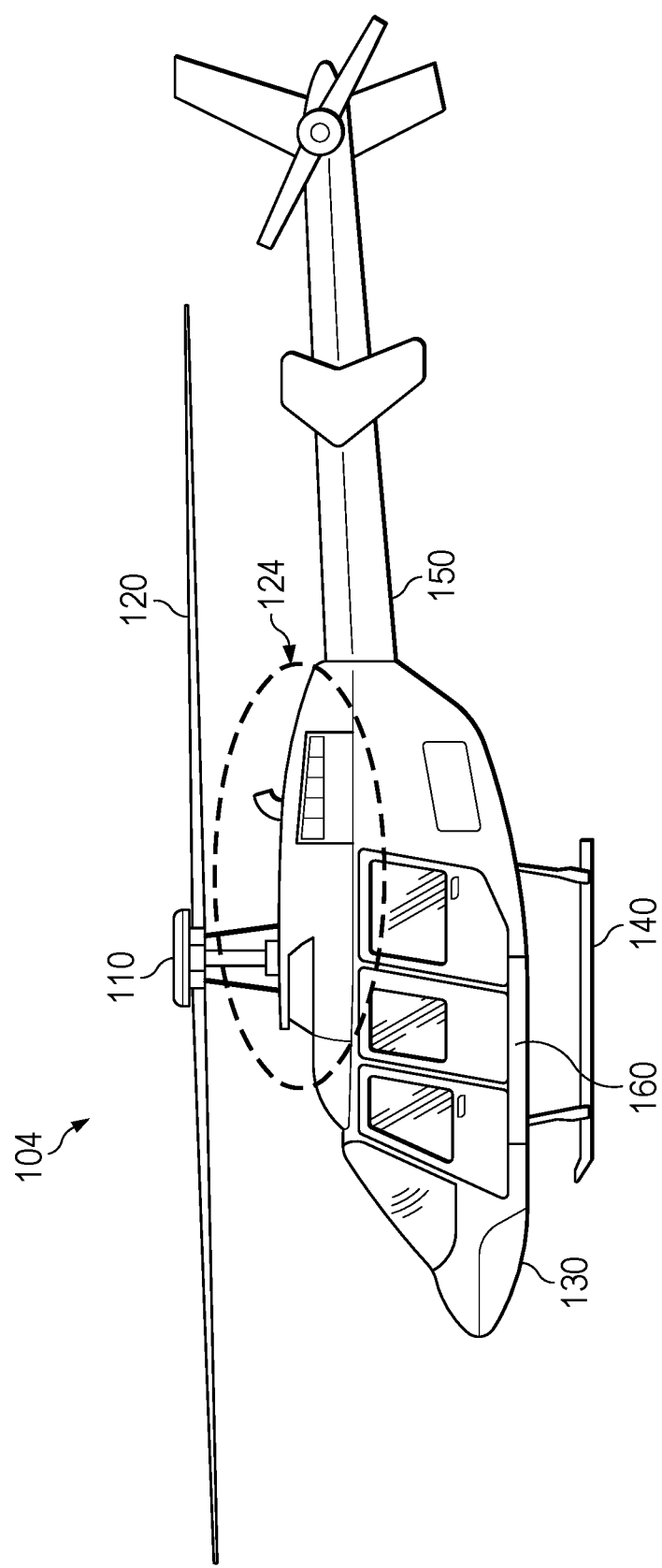
FIG. 1 is a diagram of an exemplary rotorcraft in which embodiments of the present disclosure may be implemented.

Turning now to FIG. 1, which provides a diagram of rotorcraft 104 in accordance with various implementations described herein. The rotorcraft 104 may comprise an aircraft, such as, e.g., a helicopter or some other type of similar rotorcraft.

Figure 2A:
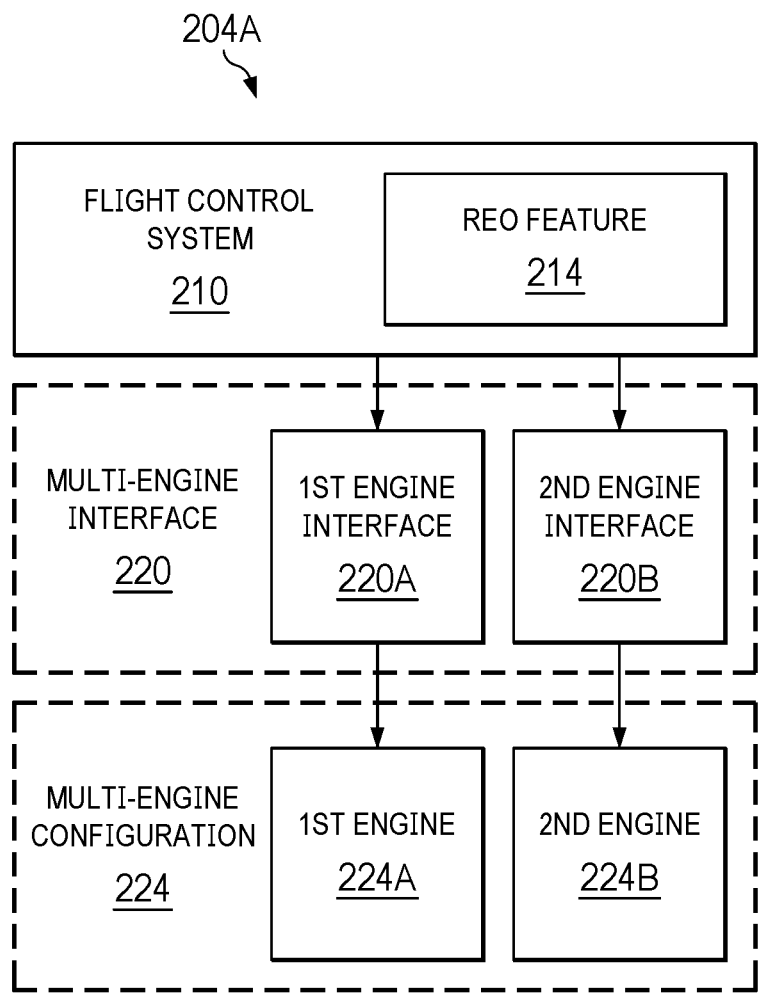
FIGS. 2A and 2B are diagrams of multi-engine architectures.
Figure 2B:
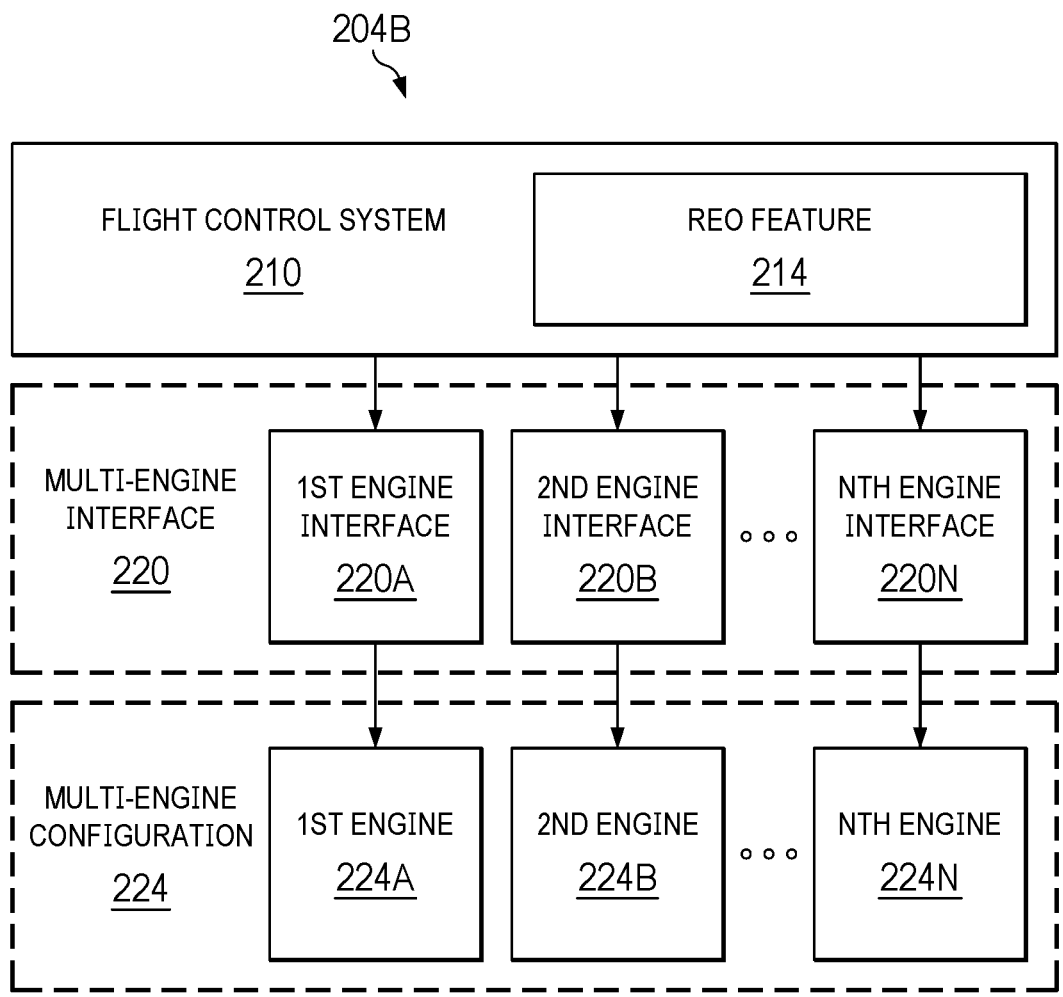
Figure 3:
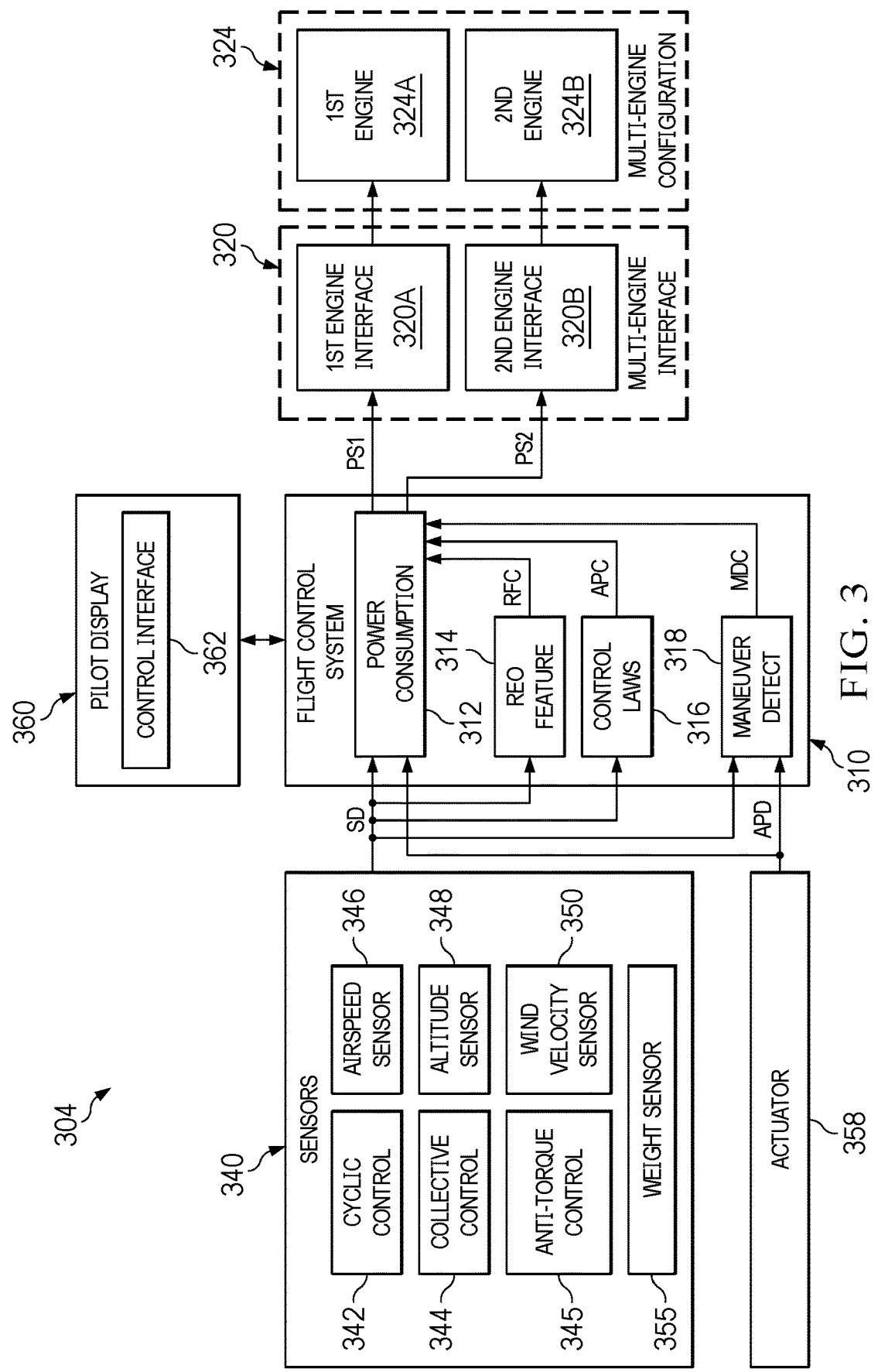
FIG. 3 illustrates a multi-engine flight formation system.

In various implementations, the rotorcraft 104 refers to various types of rotary-wing aircraft, such as, e.g., a rotorcraft, a helicopter or similar craft. The rotorcraft 104 includes a rotor system 110, one or more blades 120, a fuselage 130, landing gear 140, and an empennage 150. The rotor system 110 is attached to an upper portion of the fuselage 130, and also, the rotor system 110 has an engine compartment 124 with multiple engines arranged in a multi-engine configuration. The rotor system 110 may be configured to rotate the blades 120 during flight, and also, the rotor system 110 may utilize a flight control system (not shown) for selectively controlling the pitch of each blade of the blades 120 so as to allow a pilot (or in some embodiments, an autonomous or semi-autonomous control system) to selectively control direction, thrust, and/or lift of the rotorcraft 104. As described in greater detail herein, a flight control system (e.g., as shown in FIGS. 2A-2B and 3) may be used to operate multiple engines in a reduced-engine operation (REO) mode that refers to a high-efficiency mode of operation for shutting-down at least one engine of the multiple engines. In some scenarios, the reduced-engine operation (REO) may refer to a reduced-engine cruise mode of operation, such as, e.g., a single-engine cruise (SEC) mode of operation. FIGS. 2A-2B illustrate diagrams of multi-engine architecture 204 in accordance with various implementations described herein. In particular, FIG. 2A shows a diagram of a multi-engine architecture 204A with two engines in a multi-engine configuration, such as, e.g., a twin-engine configuration, and in addition, FIG. 2B shows a diagram of another multi-engine architecture 204B with N engines (N being two or more) in a multi-engine configuration. The multi-engine architecture may utilize a reduced-engine operation (REO) technique for an aircraft or rotorcraft.

In various implementations, as shown in FIG. 2A, the multi-engine architecture 204A may be utilized in various types of aircraft, such as, e.g., the rotorcraft 104 shown in FIG. 1, which may refer to a rotary-wing type of aircraft, such as, e.g., a helicopter or a similar type of rotorcraft. The multi-engine architecture 204A may include a multi-engine configuration (MEC) 224 with multiple engines 224A, 224B, such as, e.g., two engines in a twin-engine configuration. In addition, the multi-engine architecture 204A may include a flight control system 210 coupled to the multiple engines 224A, 224B with a multi-engine interface (MEI) 220 having multiple engine interfaces, including, e.g., a first engine interface 220A and a second engine interface 220B. In some scenarios, the flight control system 210 is coupled to the first engine 224A via the first engine interface 220A, and the flight control system 210 is also coupled to the second engine 224B via the second engine interface 220B. Also, the multi-engine configuration (MEC) 224 utilizes the multiple engines 224A, 224B, such as, e.g., multiple turbo-shaft engines or various other types of engines.

In some implementations, the flight control system 210 includes a reduced-engine operation (REO) feature 214 (or control module) that is configured to implement the reduced-engine operation (REO) technique. The flight control system 210 is configured to shutdown at least one engine of the multiple engines 224A, 224B during reduced-engine operation (REO) by continuously sensing and/or calculating various flight parameter (such as, e.g., minimum altitude, airspeed, altitude, and the like) and determining whether REO mode can be safely entered. In some scenarios, as shown in reference to FIG. 2A, the multiple engines 224A, 224B may include two engines, and the reduced-engine operation (REO) may refer to a reduced-engine cruise or a single-engine cruise (SEC) mode of operation for shutting-down at least one engine of the two engines. In some other scenarios, as shown in reference to FIG. 2B, the multiple engines 224A, 224B, . . . , 224N may include any number (N) of engines, such as, e.g., two or more engines, and also, the reduced-engine operation (REO) may refer to a high-efficiency mode of operation for shutting-down one or two or more engines of the two or more engines. Also, the multi-engine configuration (MEC) utilizes the multiple engines 224A, 224B . . . 224N, such as, e.g., multiple turbo-shaft engines or various other types of engines.

In various implementations, the flight control system 210 provides visual indication of the altitude to a pilot with a gauge including current altitude versus a minimum altitude for the reduced-engine operation (REO). Also, the flight control system 210 may be configured to calculate the minimum altitude based on one or more of pressure altitude, density altitude and height above-ground-level (AGL), and the flight control system 210 may be configured to calculate the minimum altitude with an altitude margin built-in for safety. In some scenarios, the gauge may refer to a dedicated reduced-engine operation (REO) display control panel that has an altitude gauge, one or more push buttons to engage/disengage the reduced-engine operation (REO), and/or a visual display that displays status messages and caution-warning-advisory (CWA) messages related to the REO system. Also, in some scenarios, the flight control system 210 may be configured to prevent activation of the reduced-engine operation (REO) when any full authority digital engine control (FADEC) caution-warning-advisory (CWA) messages are active. Also, the gauge provides a mode message that indicates availability of the reduced-engine operation (REO) based on flight parameters, power requirements, and the like, and the gauge provides an engaged-disengaged message that indicates whether the reduced-engine operation (REO) is currently engaged or disengaged.

In some implementations, the flight control system 210 is configured to selectively shutdown at least one engine of the multiple engines based on input from a pilot, and also, the flight control system 210 is configured to provide visual indication (e.g., via the gauge) of the at least one engine selectively shutdown by the pilot. As used in this disclosure, the term pilot is intended to be broadly construed, and is not limited to a human operator. Unless indicated otherwise by the context in which the term is used, the term pilot may refer to a human operator operating the aircraft from within the aircraft, or operating the aircraft remotely from, e.g. a land-based control center, as well as a flight control system, such as FCS 210 operating the aircraft autonomously or semi-autonomously.

Further, in some implementations, upon selective activation of the reduced-engine operation (REO) by a pilot, the flight control system is configured to adjust operation of the at least one engine of the multiple engines by throttling the at least one engine to IDLE, sub-IDLE, or completely OFF (i.e., completely shut down). Also, upon activation of the reduced-engine operation (REO) by a pilot, the flight control system 210 may be configured to reduce airspeed prior to shutdown of at least one engine of the multiple engines so as to prevent over-torque or over-temperature on at least one active engine of the multiple engines when the at least one engine of the multiple engines is shutdown.

In various scenarios, during flight of the rotorcraft, the flight control system 210 may utilize the REO feature 214 to engage one engine or two engines for single-engine cruise (SEC) based on the conditions described herein. In other scenarios, during landing of the rotorcraft, the flight control system 210 may utilize the REO feature 214 to engage one or more engines based on the conditions described herein.

In various implementations, as shown in FIG. 2B, the multi-engine architecture 204B may be utilized in various types of aircraft, such as, e.g., the rotorcraft 104 shown in FIG. 1, which may refer to a rotary-wing type of aircraft, such as, e.g., a helicopter or a similar type of rotorcraft. The multi-engine architecture 204B may include a multi-engine configuration (MEC) with any number (N) of engines 224A, 224B, . . . , 224N, such as, e.g., three or more engines, and also, the reduced-engine operation (REO) may refer to a high-efficiency mode of operation for shutting-down one or two or more engines of the two or three or more engines. Moreover, in various scenarios, the multi-engine configuration (MEC) utilizes the multiple engines 224A, 224B . . . 224N, such as, e.g., multiple turbo-shaft engines or various other types of engines. Also, the multi-engine architecture 204B may have the flight control system 210 coupled to the multiple engines 224A, 224B, . . . , 224N with the multi-engine interface (MEI) 220 having any number (N) of engine interfaces 220A, 220B, . . . , 220N coupled to corresponding engines 224A, 224B, . . . , 224N. In some scenarios, the flight control system 210 may be coupled to the multiple engines 224A, 224B . . . 224N via the corresponding engine interfaces 220A, and 220B . . . 220N.

In various scenarios, during flight of the rotorcraft, the flight control system 210 may utilize the REO feature 214 to engage two or more engines for the reduced-engine operation (REO) based on the conditions described herein. Further, in various other scenarios, during landing of the rotorcraft, the flight control system 210 may utilize the REO feature 214 to engage two or more engines based on the conditions described herein. For instance, during flight of the rotorcraft, the flight control system 210 may utilize the REO feature 214 to engage three of five engines (or two of four engines, etc.) for the reduced-engine operation (REO) based on the ambient conditions.

In various implementations, in reference to FIGS. 2A-2B, the flight control system 210 is configured to provide for every phase of air-flight of an aircraft, including, e.g., take-off, flight, cruise, and landing. In various instances, each engine (e.g., each turbo-shaft engine) may have a gas generator and a free turbine supplied by the gas generator to provide power to the rotor blades. At take-off and in continuous speed, the power supplied to the rotor blades may range between pre-determined minimum values and maximum values. Also, each gas generator has an air compressor coupled to a combustion chamber to compress air and fuel for expansion in the turbine to thereby drive into rotation the compressor via driving shafts. The gases also drive a free power transmission turbine, and the free turbine transmits power via a power transfer box that centralizes the power supplied to the loads (e.g., rotor driving, pumps, alternators, starter/generator device, etc.).

In various implementations, the multiple engines in the multi-engine configurations are substantially similar or somewhat different, and each engine may be coupled to a driver in the engine interface. Also, each driver drives into rotation a corresponding gas generator and/or a starter for starting and/or re-starting a corresponding engine. During operation, each engine and driver combination may be managed, controlled and operated by the flight control system 210, which may be under supervisory control by a digital command device for flight motorization, such as, e.g., full-authority digital engine control (FADEC).

FIG. 3 illustrates a multi-engine flight formation system 304 in accordance with implementations described herein. As shown in FIG. 3, the multi-engine flight formation system 304 may be used in various types of aircraft, such as, e.g., the rotorcraft 104 in FIG. 1. The multi-engine flight formation system 304 may have a flight control system 310 with a power consumption module 312, a reduced-engine operation (REO) feature module 314, a control laws module 316, and a maneuver detect module 318. The power consumption module 312 may utilize a formation flight program that is executed on a flight control computer (FCC) in data communication with sensors 340, actuators 358, and an engine subsystem having a multi-engine interface 320 and a multi-engine configuration 324. The flight control system 310 may use the control laws module 316 to generate actuator position commands APC to move the actuators 358 based on sensor data SD from the sensors 340. The power consumption module 312 may use the sensor data SD from the sensors 340, actuator position commands APC, control laws module 316, actuator position data APD from actuators 358, or any combination thereof to determine and/or anticipate real-time power demand of multiple engines 324A, 324B, which may include any number of engines in a manner as described herein, e.g., in FIGS. 2A-2B.

In various implementations, the flight control system 310 is configured to generate and provide one or more power signals PS1, PS2 to the multi-engine interface 320 so as to modify and/or adjust power output of the multiple engines 324A, 324B. For instance, engine control may be performed in response to pilot commands or, in case of unmanned computer-controlled aircrafts (or auto-pilot mode), as directed by multi-engine flight formation system 304 of the rotorcraft. In various implementations, the multi-engine interface 320 may have multiple engine interfaces 320A, 320B to adjust the power output of the multiple engines 324A, 324B before application of the power signals PS1, PS2 by the power consumption module 312 to the multiple engines 324A, 324B so as to maintain the rotational speed of one or more blades 120 of the rotorcraft 104 within a determined aircraft positioning.

In some implementations, the sensors 340 may detect various flight parameters of the rotorcraft 104 to form the sensor data SD that is used by the power consumption module 312, either directly or indirectly, to control flight of the rotorcraft 104. The sensors 340 may have a cyclic control sensor 342 that detects position or motion of cyclic control, which forms part of the sensor data SD. The sensors 340 may have a collective control sensor 344 that detects a position or movement of the collective control of rotorcraft 104. The sensors 340 may also have an anti-torque control sensor 345 that detects a position or movement of the anti-torque control (e.g., pedal input) of the rotorcraft 104. The sensors 340 may have an airspeed sensor 346 (e.g., as part of a pitot-tube/pitot-system) that may utilize a Doppler radar, global positioning satellites and/or other airspeed detection techniques. The sensors 340 may also have an altitude sensor 348, such as, e.g., a radar altimeter, an attitude sensor and/or an above-ground-level AGL detector. The sensors 340 may also have a wind velocity sensor 350. The sensors 340 may also include an aircraft gross weight sensor (e.g., cargo weight sensor 355), in some embodiments). In various other instances, the different types of sensors 340 may also include an aircraft gross weight sensor (e.g., cargo weight sensor), a rotor speed sensor, a nacelle tilt angle sensor, a helicopter/tiltrotor aircraft pylon angle sensor, an engine power turbine output speed sensor, an engine gas temperature sensor, a throttle position sensor, an engine compressor speed sensor, an engine torque output sensor, an actuator position sensor, a pressure altitude sensor, a compressor air temperature sensor, a fuel metering valve position sensor, etc.

In various implementations, the flight control system 310 is configured to receive the sensor data SD from the sensors 340 and also receive the actuator position data APD from the actuators 358. In some scenarios, the sensors 340 may provide sensor data to the modules 312, 314, 316, 318, and the actuators 358 may provide actuator position data APD to the modules 312, 318. As such, the reduced-engine operation (REO) feature module 314 may receive sensor data SD and provide REO feature command signals RFC to the power consumption module 312 based on the sensor data SD. Also, the control laws module 316 may receive sensor data SD and then provide actuator position command signals APC to the power consumption module 312 based on the sensor data SD. Further, the maneuver detect module 318 may also receive sensor data SD and then provide maneuver detect command signals MDC to the power consumption module 312 based on the sensor data SD. Moreover, the power consumption module 312 may receive data signals SD, SPD, receive command signals RFC, APC, MDC, and then generate and provide the power signals PS1, PS2 to the multiple engine interfaces 320A, 320B so as to thereby control the multiple engines 324A, 324B based on the data signals SD, SPD and the command signals RFC, APC, MDC. Also, in some scenarios, the flight control system 310 may provide audio/visual output to a pilot via a pilot display 360, wherein the pilot is able to interface with the flight control system 310 by way of a control interface 362 associated with the pilot display 360.

The control laws module 316 may generate commands to maintain a suitable yaw, pitch and/or roll of the rotorcraft 104 along with issue commands to maintain the power output provided to the multiple engines 324A, 324B to maintain these three axes. The control laws module 316 may also issue other commands, such as, e.g., G-command, pitch rate feedback or similar, to regulate flight of the rotorcraft 104. The actuators 358 may have any type of actuator that moves a portion of the rotorcraft 104, such as, e.g., rotor blade assemblies, based on the sensor data SD. The actuators 358 may be individually moved between various actuator positions, and the actuators 358 may include main rotor actuators that are operable to adjust the pitch angle of the rotor blade assemblies, collectively and/or cyclically. In some instances, other types of actuators 358 that may be implemented include tail rotor actuators, control surface actuators and/or various other types of actuators.

In some implementations, the power consumption module 312 may be configured to anticipate additional power consumption on the multiple engines 324A, 324B using sensor data SD to form the power signals PS1, PS2 (e.g., power consumption signal). For instance, the power signals PS1, PS2 may be used by the engine interfaces 320A, 320B to adjust the power output of the multiple engines 324A, and 324B. In some scenarios, the multi-engine flight formation system 304 may receive sensor data SD that includes a cyclic control position that is detected by the cyclic control sensor 342 so as to adjust the cyclic pitch of the rotor blade assemblies when an increased power output has been demanded from the multiple engines 324A, 324B. Therefore, the power signals PS1, PS2 may cause the engine interfaces 320A, 320B to increase the power output of the multiple engines 324A, and 324B.

In some implementations, the multi-engine flight formation system 304 may further compensate for increases in power expectance and power consumption rate due to inputs in various axes, such as laterally or directionally, with differing ambient condition or vehicle state compensation schedules. For instance, in some scenarios, the multi-engine flight formation system 304 may be configured to filter the power signals PS1, PS2 to remove one or more steady components and/or shape the power signals PS1, PS2 to match a flight positioning for formation flight, which may be associated with one or more flight parameters detected by sensors 340. The multi-engine flight formation system 304 may also adjust the power signals PS1, PS2 based on various ambient conditions, such as, e.g., altitude data from the altitude sensor 348 and/or airspeed data from the airspeed sensor 346. Further, in some scenarios, when generating the power signals PS1, PS2, the multi-engine flight formation system 304 may provide differing weights to the sensor data SD, the actuator position commands APC, and/or the actuator position data APD, according to a weighting algorithm. For instance, the power consumption module 312 may attribute differing weights to the data provided by the various sensors 340. Moreover, the power consumption module 312 may weigh data from each of the cyclic control sensor 342, the altitude sensor 348 and the collective control sensor 140 differently when generating the power signals PS1, PS2.

In some implementations, the multi-engine flight formation system 304 may include the maneuver detection module 318 configured to detect various maneuvers (e.g., movement to determine power consumption) performed by the rotorcraft 104 based on the sensor data SD. The multi-engine flight formation system 304 may indirectly use the sensor data SD to form the power signals PS1, PS2 by processing the maneuvers detected by the maneuver detection module 318. Also, the multi-engine flight formation system 304 may have any other equipment that enables ground-to-aircraft communications, aircraft-to-aircraft communications, or the like (e.g., wireless networking).

In some implementations, the multi-engine flight formation system 304 may include the reduced-engine operations (REO) feature module 314 to provide the flight control system 310 with capability of a high-efficiency mode of operation for the rotorcraft 104. For instance, the flight control system 310 may be configured to interface with the multiple engines 324A, 324B, e.g., via the power signals PS1, PS2 provided to engine interfaces 320A, 320B. Also, the flight control system 310 may be configured to continuously calculate the minimum altitude of the rotorcraft 104 for reduced-engine operation (REO) based on the aircraft descent rate (ADR) and/or the engine restart time (ERT). Also, the flight control system 310 may be configured to shutdown at least one engine of the multiple engines 324A, 324B if the calculated altitude is determined to be a sufficient altitude for reduced-engine operation (REO). Also, after shutdown, the flight control system 310 may be configured to restart the at least one engine of the multiple engines 324A, 324B if the calculated altitude is determined to be an insufficient altitude for reduced-engine operation (REO).

Figure 4:
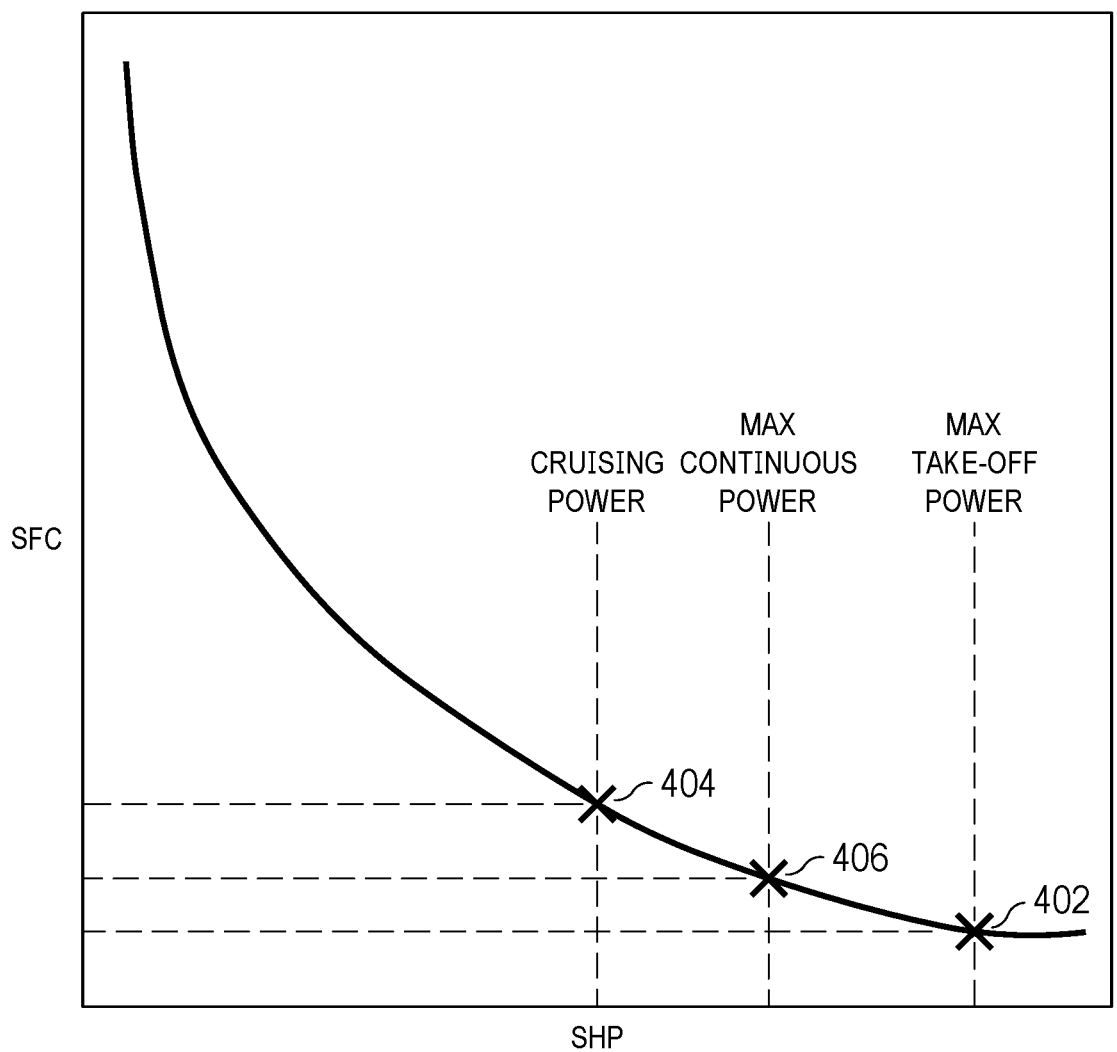
FIG. 4 is a chart illustrating the relationship between specific fuel consumption and shaft horse power of an exemplary engine.

With the above general context in mind, attention is now directed to FIG. 4, which provides an idealized graph 400 illustrating the relationship between specific fuel consumption (SFC) versus the shaft horse power (SHP) produced by an engine (e.g., 224A, 224B, 224N, etc.). For ease of explanation, FIG. 4 will be discussed in the context of a two engine aircraft. Those skilled in the art will recognize that this teaching can be readily applied to a multi-engine aircraft having more than two engines, however. SFC is typically measure in units of pounds of fuel per hour per shaft horse power. As FIG. 4 illustrates, specific fuel consumption reduces and thus improves as the shaft horse power increases, which reflects an improved efficiency within the engine's thermodynamic cycle. The relationship illustrated in FIG. 4 applies for a single engine providing power.

Data point 402 illustrates the maximum SHP that would be required of each engine during twin-engine operation, the power required during the takeoff phase of a flight. Interestingly, this maximum power point is at or near the lowest point of the specific fuel consumption curve. In other words, when the engines, are at or near their maximum safe power output they are also at or near their maximum fuel consumption efficiency. Note, however, that take-off power is typically required for only a short duration, usually only for a few minutes of the flight. During normal flight conditions such as cruising, less SHP is required of the engines, as indicated by data point 404 of the graph. Data point 404 represents the point on the curve that represents steady flight cruising conditions, which conditions require less SHP from the engines than does takeoff. Note that at this lower SHP condition, the SFC performance of the engines is less than during the take-off conditions. Empirical data suggests that the fuel consumption (pounds of fuel per hour) is between 15% and 20% less efficient when cruising on two engines, both operating at part power versus cruising with one engine in an REO (or OFF) mode and using the other engine to power the flight, thus maximizing power on the on-line engine.

As a matter of aircraft safety, it is generally recognized that both engines of a twin-engine aircraft should be in full operational mode during critical conditions such as take-off, landing, near-ground hovering, and the like. By contrast, during cruising conditions, the SHP required of the power plant is generally below the maximum continuous power level (indicated by data point 404) of a single engine of the multi-engine power plant. Under these conditions, by placing one engine into a reduced operation mode and allowing the other engine to provide SHP at or near its maximum continuous power rating, that engine operates at a much more efficient point (point 402) on the specific fuel consumption curve than two engines operating at their respective cruising power range (point 404). Hence, improved fuel consumption efficiency is obtained. Stated another way, and perhaps counter-intuitively, one engine providing a higher level of SHP is more fuel-efficient than two (or more) engines, each providing a lower SHP, as evidenced by the curve of FIG. 4.

Figure 5:
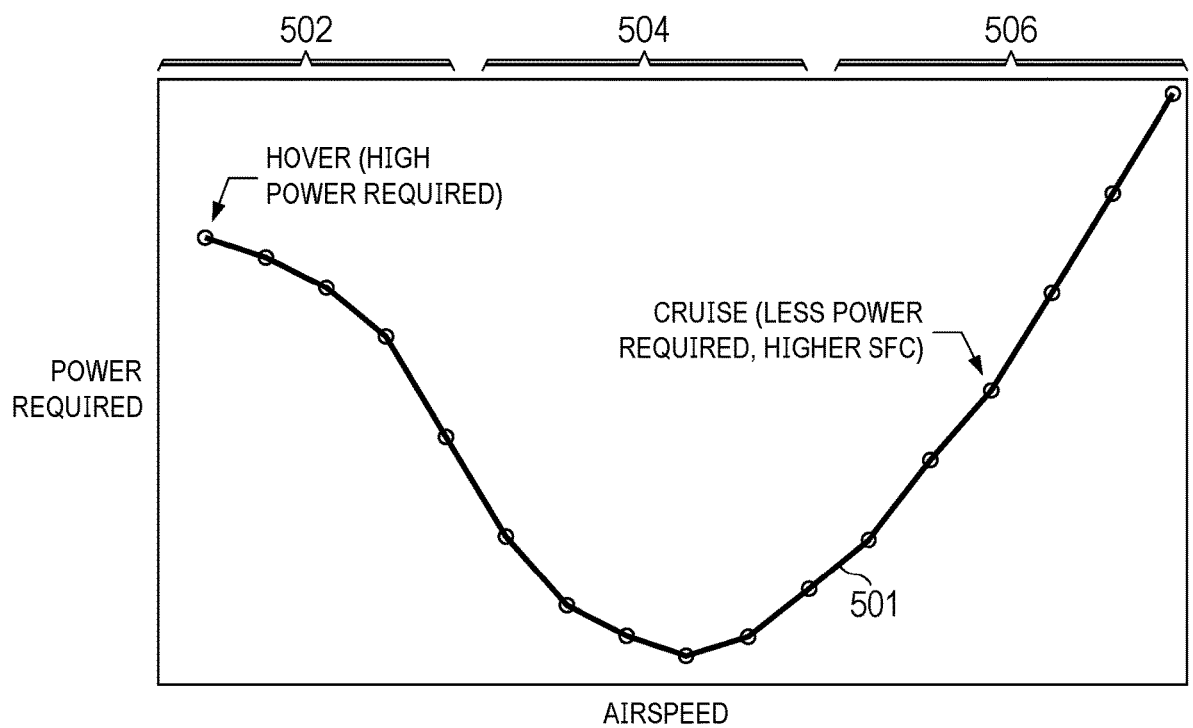
FIG. 5 is a chart illustrating the relationship between the power required from an aircraft power plant versus the airspeed of the aircraft.

This concept is further illustrated with reference to FIGS. 5 and 6. FIG. 5 represents an idealized relationship between the power required from an aircraft power plant versus airspeed of the aircraft. A first portion of curve 501 represents a hover flight condition, where an aircraft such as a helicopter is hovering at a low airspeed near the ground. Although the airspeed is low, a relatively high amount of power (SHP) is required to maintain the aircraft in a hover, as indicated by region 502 of curve 501. When the aircraft transitions from the hover condition to a cruising condition, less SHP power is required, as shown by region 504 of curve 501. At some point, however, further increases in airspeed require increased SHP from the engines, as indicated by region 506 of curve 501. As an example, an airspeed of around 60 knots to around 80 knots will typically be a cruising speed requiring the least amount of SHP (region 504), and SHP will increase for airspeeds above that range (region 506). This general rule is dependent upon the specifics of the aircraft and flight conditions (altitude, OAT, etc.) but curve 501 is sufficient for purposes of explaining the general relationship between airspeed and SHP requirements.

Figure 6:
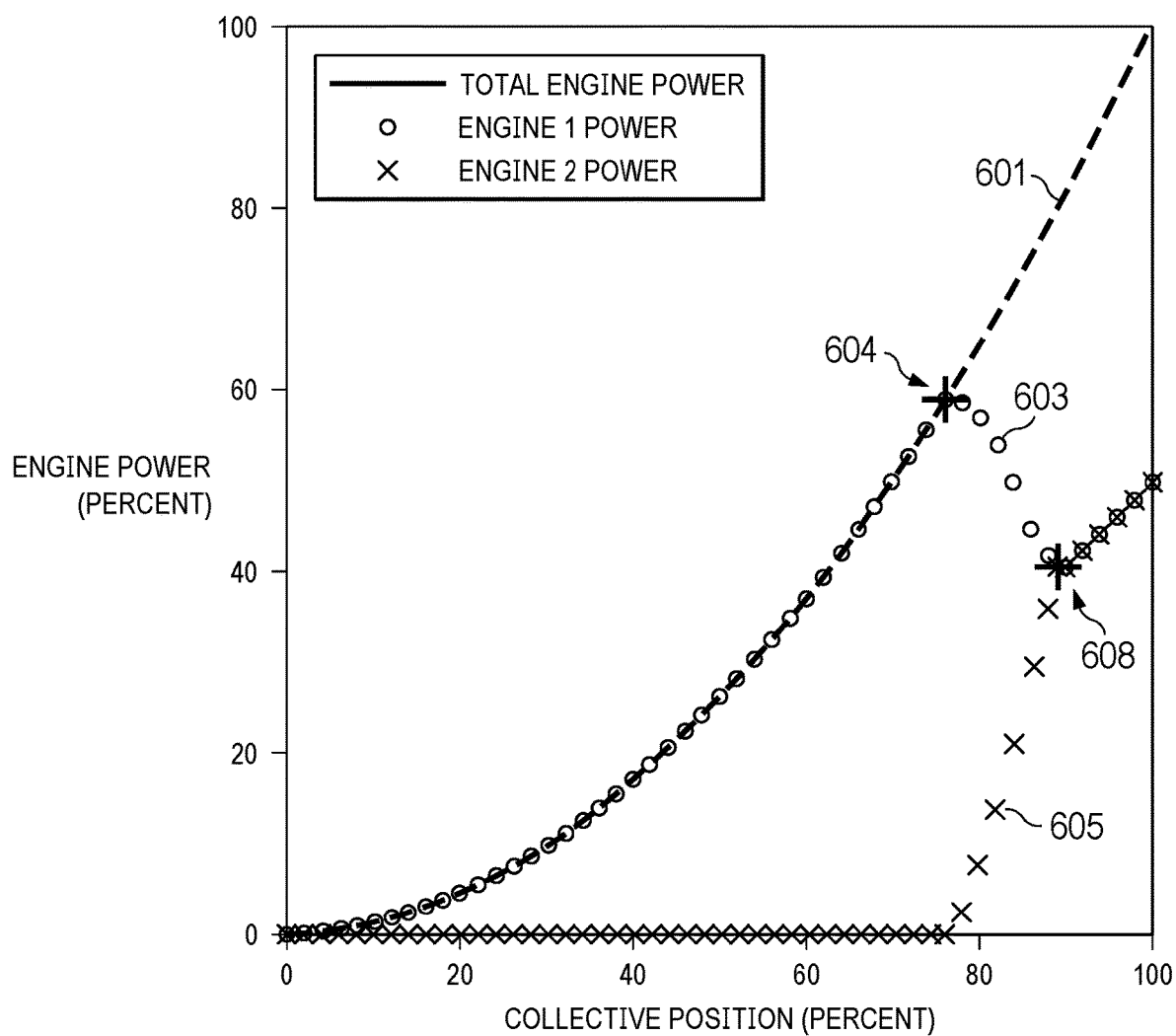
FIG. 6 is a chart illustrating how power (delivery) is shared between two engines of a two-engine power plant.

FIG. 6 illustrates the relationship between the total SHP that may be required of a two engine power plant versus a power level command, collective position in this example. More specifically, curve 601 represents the SHP of the power plant (the ordinate of graph 600) versus the position of the collective control of the aircraft (the abscissa of graph 600). One skilled in the art will recognize that collective control is but one example of a pilot input control and that other forms of control device are within the contemplated scope of this disclosure. As shown by curve 601, the engine power (SHP) required of the power plant corresponds directly to the collective position, with effectively no SHP required when the collective is in its neutral position (represented by 0% on the abscissa) and 100% SHP required when the collective is in its maximum position (represented by 100% on the abscissa). In this illustrated example it is assumed that each engine of the two engine power plant has a maximum continuous power rating.

As addressed above, curve 601 represents the total SHP power of the power plant (i.e., both engines) required by the aircraft, such as a function of collective position. Curves 603 and 605 represent the SHP of a first engine (termed Engine 1) and a second engine (termed Engine 2), respectively, in an exemplary embodiment. In this embodiment, it is assumed that the maximum continuous power rating for Engine 1 is 60% of the maximum engine power, and likewise for Engine 2 the maximum continuous power rating is 60% of the maximum engine power. In other words, when the collective position remains below 80%, the SHP requirement is below the 60% maximum continuous power threshold for the engines. Under such conditions, a single engine, such as Engine 1 for example, is able to provide the safely meet the power demands. This is indicated by curves 603 and 605, wherein curve 603 illustrates Engine 1 provided power, while curve 605 illustrates Engine 2 remains in an off or reduced operation state (0% engine power). Note, however, from curve 603 that once collective position moves beyond 80%, point 604, the SHP requirement exceeds the 60% of maximum engine power threshold. Hence, at this point Engine 2 is taken out of the reduced operation mode and returned to a full operation mode, wherein curve 605 increases from 0%, indicating the Engine 2 is now providing a portion of the required total engine power. Likewise, as indicated by curve 603, once Engine 2 begins contributing to the total required power, the amount of power required of Engine 1 decreases and hence Engine 1 does not exceed the 60% threshold for maximum engine power. As collective position further increases (above the 80% position in the illustrated embodiment), both Engine 1 and Engine 2 contribute to meeting the demand for total power, with each engine eventually contributing power equally, as indicated at point 608. One skilled in the art will recognize that the relationship between collective position and engine power will vary depending upon the type and design of the aircraft and can be determined empirically and/or through modeling or the like; the correlation of 80% collective position corresponding to 60% of maximum engine power is simply one example and it not a limitation of the present disclosure.

Tying FIGS. 5 and 6 together with FIG. 4, region 502 of curve 501 represents a flight condition wherein the power required to maintain hover exceeds the maximum continuous power rating of a single engine (corresponding to a collective position at or above 80% in FIG. 5). Under these conditions, both engines will be maintained in a full operational mode. Per graph 400 of FIG. 4, both engines will provide power at a lesser fuel consumption efficiency level—but aircraft safety necessitates this trade-off in efficiency when balanced against safety. Region 504 of curve 501 represents a flight condition wherein the power required to maintain a cruising airspeed is below the maximum continuous power rating of a single engine (corresponding to a collective position below 80% in FIG. 6). Under these conditions, one of the engines can be placed in a reduced operation mode. This will require that the remaining engine provide a higher level of SHP power, which drives that engine lower on the SFC fuel consumption curve of FIG. 4. In this manner, fuel consumption performance is improved, while at the same time maintaining sufficient margins for safety and also providing sufficient margins to avoid overtaxing the engine(s) and/or prematurely deteriorating the engine performance. In the above discussion the threshold is based upon the maximum continuous power rating for the given engine(s). It is contemplated, however, that other engine ratings, such as takeoff power, maximum power, OEI (one engine inoperative) ratings, or the like, could be used as the threshold value. Further, this threshold value can be deviated (upwards or downwards) form the selected engine rating, as will be discussed below. As a general guide, the threshold should be selected to provide the greatest (or at least a desired level of) trade-off between the competing goals of maximizing fuel consumption efficiency (which drives toward a higher threshold value placing an engine(s) in REO mode) versus maximizing aircraft safety and the ability to quickly recover from expected or unexpected changes in flight conditions (which drives toward a lower threshold value). The above discussion provides the context of an aircraft that is already in a REO mode and addresses when to exit the REO mode and to re-engage one or more engines of the multi-engine architecture. Of course, the same concepts apply for making the determination of when to enter into the REO mode. In other words, when two (or more) engines are operating in full operational mode and the collective position moves to below the 80% position, indicating that the engine power requirement is below the 60% threshold (point 604), then flight control system 310 will recognize that one (or more) of the engines can be safely placed into REO mode, whereby the remaining engine(s) can safely provide the required power, as explained above and further explained below.

With the above concepts in mind, greater detail will now be disclosed regarding a process for determining whether and when to enter into an economy mode of operation of an aircraft by placing one (or more) of the engines into a reduced operation state.

Figure 7:
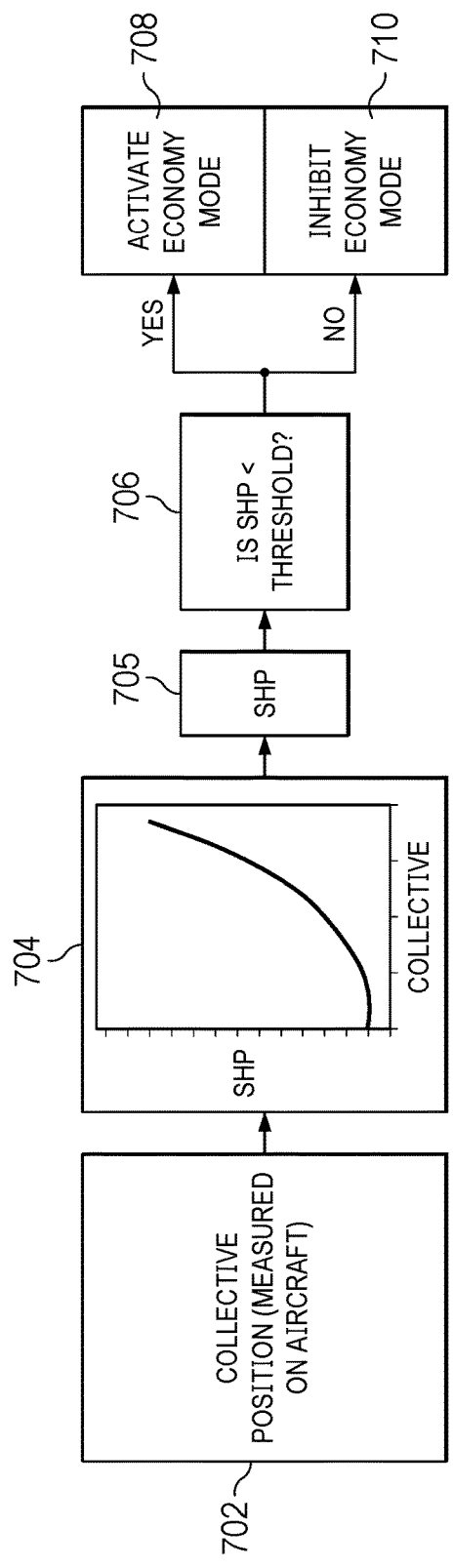
FIGS. 7, 8, and 9 schematically illustrated exemplary methods for controlling an economy mode state of an aircraft.

In a first embodiment, illustrated in FIG. 7, the determination of when and whether to enter into an economy mode of operation and place an engine into a reduced operation state is made based upon collective position. In this embodiment, collective position is sensed during operation of the aircraft, as schematically represented by block 702 of FIG. 7. As addressed above, the amount of power demanded of the engines is directly related to the position of the collective control. As further addressed above, exemplary rotorcraft 104 has a collective control sensor 344 that detects a position or movement of the collective control of the vehicle. This sensed collective position is fed to flight control system 310, from which flight control system 310 can determine the SHP requirement based upon the sensed collective position, as schematically illustrated by block 704 of FIG. 7. Recall from FIG. 6 that the relationship between collective position and SHP power requirements is known. While not central to the context of this disclosure, generally aircraft control is designed to ensure that there is an 'intuitive' feel to collective position, with small changes in collective position resulting in small changes in SHP, large changes in collective position resulting in a more significant change in SHP, etc. The relationship between the sensed collective position and the SHP is effectively a known parameter based upon the design of the system (e.g., full collective position corresponds to maximum power demand, zero collective position corresponds to no or minimum SHP demand, and a designed-in 'intuitive' curve between the two end points).

Continuing on with block 706, once the required SHP value is determined (block 704, with the determined SHP value indicated by block 705), this determined value is compared to a threshold value. In one embodiment, the threshold value is based upon the maximum continuous power rating for Engine 1 of the aircraft (Engine 1 being used here simply as a shorthand manner of identifying the engine that will remain in full operation mode during economy mode operation (i.e., when the other engine(s) are placed in a reduced operation state)). If the SHP value determined in step 704 is less than maximum continuous power rating of Engine 1, then flight control system 310 will allow the aircraft to enter into economy mode and place Engine 2 (and depending upon the aircraft configuration, possibly other engines as well) into a reduced operation state, as schematically illustrated by step 708. On the other hand, if the sensed collective position (step 702) results in a calculated SHP requirement (step 704) that exceeds the maximum continuous power rating threshold (step 706), then flight control system 310 will inhibit economy mode and hence will not allow for entry into economy mode operation (step 710).

An advantageous feature of the embodiment illustrated by FIG. 7 is the relative simplicity of the process. Whereas in other instances, numerous parameters, such as sensed flight conditions, must be measured, quantified, evaluated, and ultimately converted into a power requirement, in this embodiment only a single parameter (collective position) need be sensed and converted to a power requirement value. This greatly simplifies the computational demand required in order to make the determination of whether and when to enter into REO mode. As those skilled in the art will appreciate, however, and as discussed in greater detail below, several other factors and considerations may also be taken into account when determining an appropriate threshold value in other embodiments. It should further be noted that the above description suggests that entry into economy mode is automatically performed once flight control system 310 determines, based upon collective position as described above, or based upon other flight conditions as described below, that the required engine power does not exceed the threshold. While this may be true in some embodiments, it is contemplated that in other embodiments, the process illustrated in FIG. 7 and hence the decision of whether to enter into economy mode, is performed only in response to a pilot command, such as activation by the pilot of a switch, button, display screen, or other input device by which the pilot indicates the desire to place the aircraft into economy mode when flight conditions allow for it. Alternatively, the process of FIG. 7 could be initiated by input generated from flight control system 310 during autonomous or semi-autonomous flight.

Figure 8:
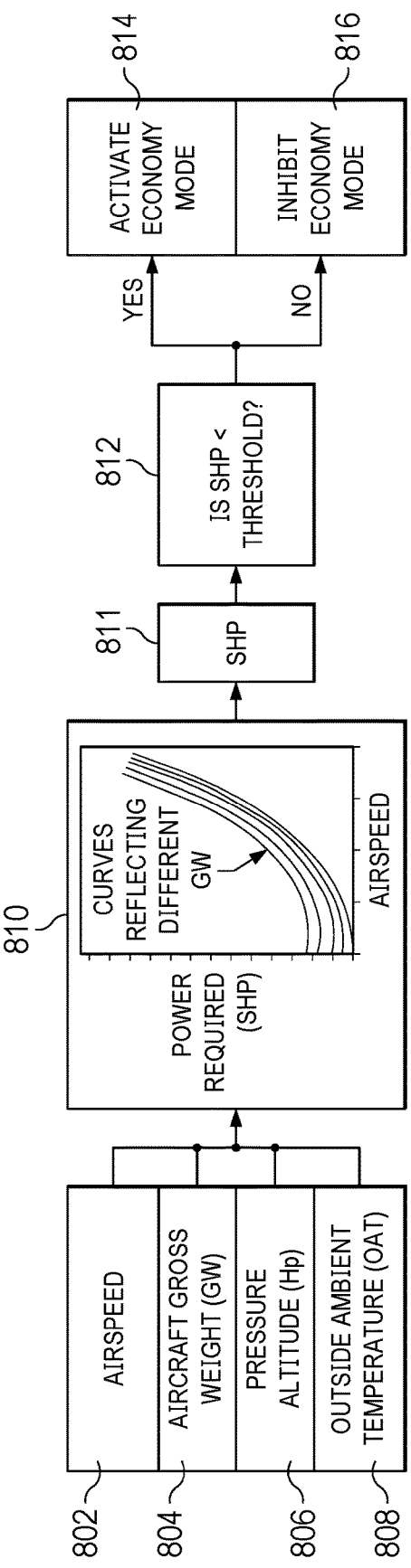

FIG. 8 illustrates another embodiment of a method and system for determining when and whether to enter into an economy mode of operation and place an engine into a reduced operation state. In this embodiment, real-time flight conditions are sensed as schematically illustrated by steps 802, 806, and 808, using sensors 340 to detect conditions such as airspeed, pressure altitude, outside ambient air temperature, respectively, and the like. A particularly advantageous feature of the embodiment illustrated in FIG. 8 is sensing aircraft gross weight (804) as a parameter in determining the power requirements for given flight conditions. While the relationship between airspeed and power (for a given altitude and OAT) is relatively static for a given model of aircraft, this relationship can be significantly impacted by changes in the aircraft gross weight. Furthermore, the gross weight for an aircraft can change significantly from mission to mission, depending upon the number of crew and passengers, the amount and composition of cargo, and the like. For military aircraft, aircraft weight can differ substantially depending upon the armaments and ordnance with which the aircraft is provisioned on any given mission. Even further, aircraft weight can deviate significantly during a single flight, for instance as fuel is consumed.

As the chart illustrated in block 810 demonstrates, the relationship between airspeed and the power required to maintain that airspeed is highly dependent upon the aircraft gross weight—and hence it is a particularly advantageous feature of this embodiment that aircraft gross weight is included in the determination of when and whether to enter into an economy mode of operation. By contrast, implementations that do not measure AGW and factor that value into the calculated power requirements might significantly under-estimate the required SHP in some circumstances (e.g., for a flight having an unusually heavy cargo load), and might significantly over-estimate required SHP in other circumstances (e.g., a flight having no cargo, or a flight with low fuel reserves).

In an embodiment, sensors 340 include an aircraft weight sensor 355 that measures the weight of the aircraft before take-off, although more typically aircraft weight is determined from a known gross aircraft weight and determined weight of cargo, crew, etc. This weight value can be stored and provided to flight control system 310 as part of the method, such as illustrated schematically by block 804. Preferably, also included in block 804 is a methodology for revising the measured aircraft weight based upon a measured or a calculated rate of fuel consumption.

Continuing on with the description of the embodiment illustrated in FIG. 8, in block 810, the power required to maintain the desired airspeed is determined based upon the sensed parameters of airspeed, altitude, OAT, aircraft gross weight (as may be adjusted in real-time or periodically to compensate for fuel consumption), and the like, resulting in a SHP value 811). As with the previously described embodiment, this SHP value is then compared to a threshold value (step 812), and if the threshold value is not exceeded, flight control system 310 will allow the aircraft to enter into economy mode whereby one (or more) of the engines is placed into a reduced operation state (step 814). Conversely if the SHP demand exceeds the threshold, then entry into economy mode is inhibited (step 816).

Figure 9:
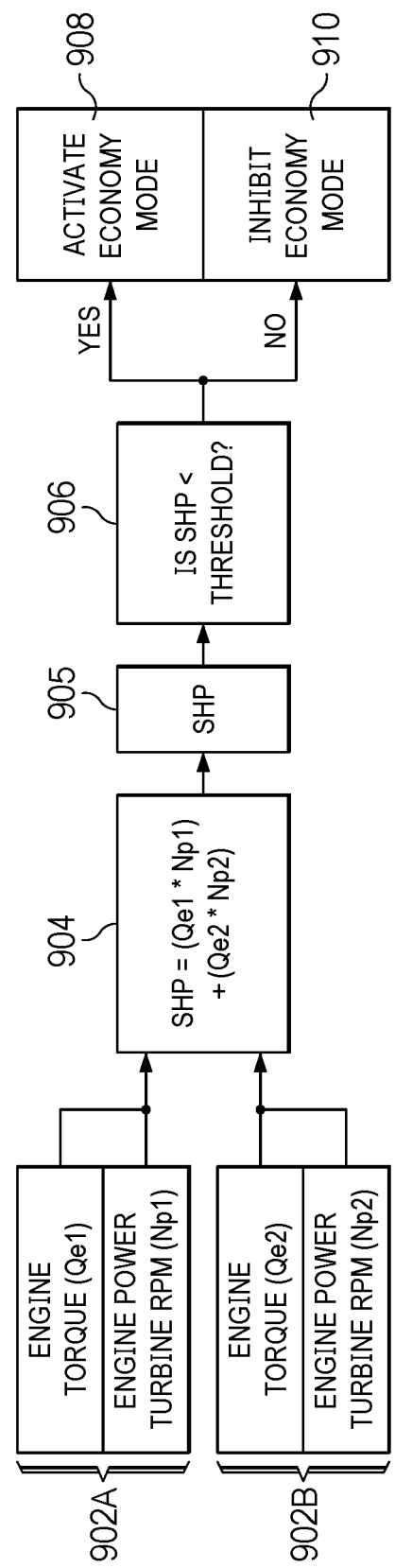

FIG. 9 illustrates yet another embodiment of a method and system for determining when and whether to enter into an economy mode of operation and place an engine into a reduced operation state. Referring first back to the embodiments illustrated by FIG. 7 and by FIG. 8, those embodiments involve, in a general sense, determining the amount of power required of the engines based upon the collective position and then-existing flight conditions, respectively. By contrast, in the embodiment illustrated by FIG. 9, the determination whether to enter into economy mode is made based upon the amount of power currently being generated by the engines (by directly measuring engine torque and engine output speed). In other words, the previous embodiments involved determining the power required and comparing that to a threshold, whereas the embodiment illustrated by FIG. 9 involves determining (e.g., by directly measuring) the amount of power being generated and comparing that to a threshold. This approach might eliminate inaccuracies that could otherwise arise in determining required engine power. As an example, and as addressed above with reference to FIG. 8, changes in AGW can significantly impact power requirements; changes in AGW during flight might not be accounted for in some embodiments that estimate the required engine power. As another example, any inaccuracy in the calculated or measured relationship between collective position and engine power, as discussed with regard to FIG. 7, will result in a corresponding inaccuracy in the estimated power. Such inaccuracies are eliminated by measuring the actual power being generated by the engine(s), as addressed in this embodiment.

Starting with block 902A, the power being output by Engine 1 is measured. This is accomplished, for instance, using sensors 340 to measure the engine torque (Qe) of Engine 1 and the engine power turbine RPMs (Np) of Engine 1. Likewise, in block 902B, sensors 340 measure the engine torque (Qe) of Engine 2 and the engine power turbine RPMs (Np) of Engine 2. In this exemplary embodiment, the aircraft has two engines. One skilled in the art will recognize that in an embodiment having more than two engines, additional blocks would be employed to sense the torque and RPMs for each of the engines for the multi-engine aircraft. In block 904, a total SHP being generated collectively is determined by first calculating the SHP being generated by each engine individually (SHP is the product of engine torque and engine output speed) and then the individual SHP values are added together to generate a cumulative SHP value representing the power being generated by the engines collectively, all as illustrated schematically by block 904. The collective SHP value (905) is then compared to a threshold value, as schematically illustrated by block 906. In a simplest embodiment, the collective SHP being generated by the engines is compared to a maximum continuous output power rating for one of the engines of the power plant. Assuming that all of the engines of the power plant have the same maximum power rating, then that rating would be the value used for the threshold. If, however, engines of differing configurations are used, then the specific threshold value employed would depend upon which engine of the power plant will remain in full operation mode during economy mode operation. In other words, reverting to the nomenclature whereby Engine 1 refers to the engine that will remain in full operation mode and Engine 2 refers to the engine that will be placed in a reduced operation state, then the threshold value corresponds, in this embodiment, to the maximum continuous output power rating for Engine 1. In other embodiments, the threshold value could be the maximum continuous power rating of the engine having the lowest maximum continuous power rating of the group of engines for the aircraft. In yet other embodiments, the threshold is based upon a different measured or calculated parameter, and the concepts disclosed herein are not limited to a maximum continuous power rating.

If the SHP power being generated collectively by the engines (block 904) is lower than the maximum continuous power rating for Engine 1 (block 906), then it would be safe to place the other engine(s) in a reduced power mode because even if Engine 1 alone generates all the required power, the threshold comparison step 906 demonstrates that the required power is within the safe operating parameters for Engine 1. Recall from FIG. 4 that operating Engine 1 at the higher end of its power range results in Engine 1 operating at the lower end of its SFC range, meaning Engine 1 will operate with improved fuel consumption efficiency. Hence, flight control system 310 will allow for activation economy mode (block 908). On the other hand, if the SHP power being generated collectively by the engines exceed the threshold value, then placing into reduced operation mode the other engine(s) would force Engine 1 to operate above it maximum continuous operation rating. Under these circumstances, flight control system 310 will inhibit entry of the aircraft into economy mode (block 910).

Figure 10:
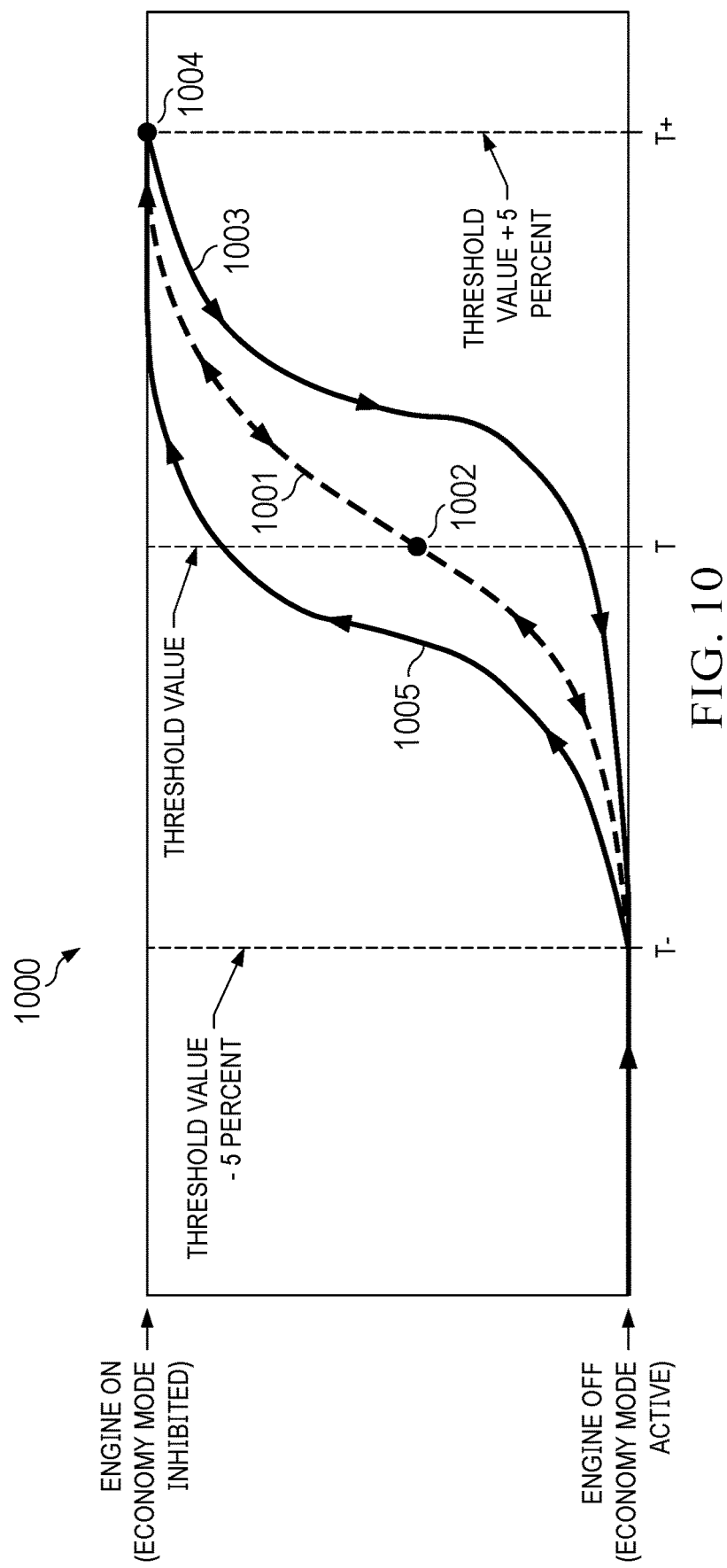
FIG. 10 is a chart illustrating methods of transitioning between an economy mode active state and an economy mode inhibited state of an aircraft.

While the above description has been focused on making the determination of when and whether to enter into a REO mode, one skilled in the art will recognize that a complete system also needs to determine when and whether to exit from REO mode because of changes in flight conditions, power requirements, and the like. From a simplest perspective, the decision to exit from REO mode could be simply the inverse of the decision to enter REO mode. For instance, REO mode can be entered if the calculated SHP requirement (FIGS. 7 and 8) or the measured SHP being produced (FIG. 9) is below a threshold value (such as maximum continuous operation rating). Intuitively, it might be assumed that during REO operation, SHP requirements would continue to be monitored and compared against the same threshold value. The risk arises, however, of an unstable feedback loop, particularly when the (calculated or measured) SHP value is at or very near the threshold value, under which circumstances the system could repeatedly cycle back and forth between activating economy mode and then inhibiting economy mode. FIG. 10 illustrates an approach, which can be applied to any of the above embodiments, to prevent this condition from occurring. In this approach, the threshold comparison (block 706 of FIG. 7, block 813 of FIG. 8, and/or block 906 of FIG. 9) is modified whereby the threshold value is decreased from its nominal value when the aircraft is not currently in REO mode (economy mode inhibited, engine(s) on), or the threshold value is increased from its nominal value when the aircraft is currently in REO mode (economy mode active, engine(s) off), or the threshold value is both decreases from its nominal value when not in REO mode and increased from its nominal value when in REO mode. In this way, even if the SHP requirement is at or near the nominal threshold value, the SHP value at which the decision to enter REO mode is "offset" from the SHP value at which the decision is made to exit from the REO mode.

The above concept is explained further with reference to FIG. 10. Chart 1000 is a more generalized version of chart 600 of FIG. 6. Whereas chart 600 illustrated an exemplary relationship between collective position (the abscissa of chart 600) versus the engine power relating to the collective position (the ordinate of chart 600), the abscissa of chart 1000 illustrates any controlling variable relating to engine power (such as collective position, as described above with respect to the embodiment illustrated in FIG. 7, or to calculated engine demand, as described above with respect to the embodiment illustrated in FIG. 8, or to measured engine power being generated, as described above with respect to the embodiment illustrated in FIG. 9). In other words, the concepts discussed with regard to FIG. 10 apply equally to the various embodiments discussed above.

Chart 1000 of FIG. 10 includes three curves, 1001, 1003, and 1005, respectively. Turning first to curve 1001, this represents a first case wherein the threshold value is independent of the current state of the system. In other words, a nominal threshold value is determined (as described above with regard to any of the above embodiments), and that nominal value is used for determining whether to activate an economy mode of operation (block 708, and/or block 814, and/or block 908) as well as for determining whether to inhibit an economy mode of operation (block 710, and/or block 816, and/or block 910). This is indicated by the arrow heads associated with curve 1001, with arrow heads pointing up the curve (moving from left to right) indicating a transition from an economy mode activated state (one or more engines being OFF or in an REO mode) to an economy mode inhibited state (all engines being ON) and with arrow heads pointing down the curve (moving from right to left) indicating transitioning from the inhibited state to the active state. Note that when in the inhibited state, when the controlling input value falls to the nominal threshold value T (indicated by point 1002 of curve), the system will enter into the REO active state and allow one or more engines to enter into REO mode. However, once in the active state, this nominal value T is also the value at which the determination is made to inhibit economy mode (again, point 1002 of curve 1001). This may result in a condition wherein the slightest deviation in the input controlling variable will cause the flight control system 310 to repeatedly fluctuate back and forth between the active and inhibited states, which would needlessly cause one or more engines to start and then re-start—contributing to decreased flight stability, increased engine wear, and increased pilot fatigue.

Curves 1003 and 1005 illustrated a preferred embodiment, whereby the threshold value is adjusted depending upon whether the current state of operation is an active state (economy mode active and hence one or more engines in an REO mode, or at least allowed to be in an REO mode) or is an inhibited state (in which REO mode is inhibited). Starting with curve 1003, the right side portion of this curve illustrates a condition where engine power demand is high (based upon the controlling variable) and hence economy mode is inhibited, as indicated by the Engine ON notation. The left hand side of this curve illustrates a condition where engine demand power is low (based upon the controlling variable) and hence economy mode is active, one or more engines are allowed to enter into an REO mode, and fuel consumption efficiency is improved. In this embodiment, the threshold value is adjusted to a value of T+ when the aircraft is in the inhibited state, as illustrated by point 1004 of curve 1003. Hence, when the controlling variable falls to the T+ value, the determination of whether to enter into the economy mode active state is made by comparing the controlling input value to the T+ value.

Turning now to curve 1005, this curve represents transitioning from an economy mode active state (on the left hand side of chart 1000) to an economy mode inhibited state (on the right hand side), corresponding to increasing value for the controlling variable. By contrast to curve 1003, when the current state is the active state, nominal threshold value T is reduced to a value of T−. Hence, when the controlling variable reaches a value of T−, flight control system 310 will switch from the economy mode active state (one more engines off) to the economy mode inhibited state (taking the engines out of REO mode) in order to meet the demand for increased power indicated by the increasing controlling variable. Note that the threshold value (T−) for transitioning out of economy mode is displaced from the threshold value (T+) for transitioning into economy mode, thus preventing the above-described fluctuation patterns.

Hence, by increasing the threshold value when the current state is economy mode inhibited, or decreasing the threshold value when the current state is economy mode active, or both, improved stability and performance is obtained. In one example, the nominal threshold value is increased by 5% when transitioning from the inhibited state to the active state, and the nominal threshold value is decreased symmetrically by 5% when transitioning from the active state to the inhibited state. This is a matter of design choice, however, and other adjustment values, including non-symmetrical adjustment values, and including adjusting the value for only one transition (such as only when transitioning from the active to the inhibited state, or only when transitioning from the inhibited to the active state) are within the scope of this disclosure.

In yet other contemplated embodiments, the nominal threshold can be effectively adjusted through the use of a delay filter that delays entry into economy mode and/or inhibition of economy mode for a period of time. Returning to the example of FIG. 10, for instance, and with regard to curve 1001, it should be noted that there is a passage of time associated with the curve, when moving from left to right or from right to left. In other words, proceeding from right to left (representing a change in the control variable), one skilled in the art will recognize that such changes do not occur instantly. Rather, some period of time occurs when shifting from point 1004 (high level of demand for power) to point 1002 (the nominal threshold level of demand for power); or at a minimum, some period of time is required for the aircraft to adjust to the change in demand. The threshold value is effectively lowered by imposing a time shift, or delay, in the response when the threshold value is reached. Again, with reference to curve 1001, if the entry into economy mode is delayed for a pre-determined period of time after the nominal threshold value T is reached, then the engine power (the ordinate value) will be further "down" curve 1001 when the transition to economy mode actually happens. This is equivalent to transitioning to economy mode instantaneously (or near instantaneously) at the adjusted T-threshold value. Similarly, by imposing a delay between the time the (increasing) control variable passes the nominal threshold value T until the time the system inhibits economy mode, then the engine power (the ordinate value) will be further "up" the curve when the transition to inhibited mode occurs, which is equivalent to transitioning to inhibit mode instantly (or near instantaneously) at the adjusted T+ threshold value. This time delay approach could be used in lieu of adjusting the threshold value or in conjunction adjusting the threshold value.

Figure 11:
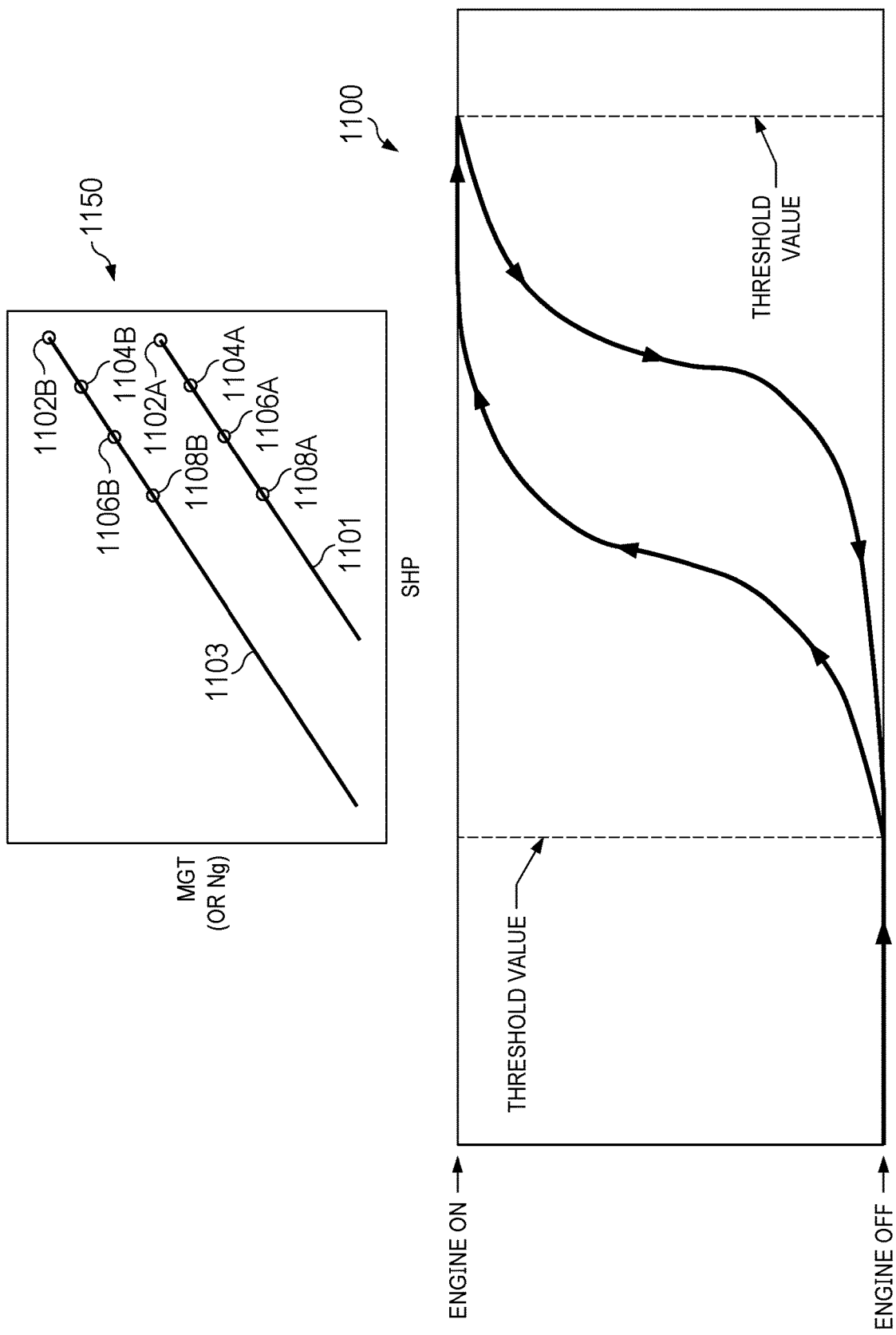
FIG. 11 illustrates an engine run line relationship showing an undeteriorated engine and a fully deteriorated (AKA "min spec") engine.

As addressed above, the nominal threshold value can be based upon various engine power ratings, including but not limited to maximum continuous power rating, take-off power raring, two minute OEI (one engine inoperable) rating, and the like. It should be noted then, that care should be taken to ensure that adjusting the nominal threshold value to a value (T+) above the nominal value does not result in a threshold value that exceeds safe flight conditions. For example, FIG. 11 includes chart 1100, which illustrates a relationship between a controlling variable and engine power (similarly to FIG. 10) and also includes chart 1150, which illustrates a relationship between engine power (in terms of SHP) and engine MGT or Ng, and includes a visual representation of engine "health" or performance as indicated/quantified by the gap/distance between the FDE (fully deteriorated engine) curve (AKA "mins spec" line) and the actual/current engine run line (such as in terms of a common unit of measurement, measured gas temperature). Curves 1101 and 1103 of chart 1100 represent the relationship between the measured gas temperature (MGT) of an engine and the power (SHP) produced by the engine for a nominally "new" engine (typically an engine that is performing above spec) and a "deteriorated" engine (meaning an engine that is performing at a "min spec" level that is at the lowest threshold for acceptable performance). This phenomenon of deteriorating engine performance is a well-understood consequence of engine usage. As curves 1101 and 1103 demonstrate, it is understood that engine performance will degrade with time and usage. For example, point 1102A of curve 1101 represents the measure MGT for a "new" engine operating at its 30 second OEI rating, whereas point 1102B of curve 1103 represents the same measured MGT for the same engine when it has reached its fully deteriorated state. Similarly, points 1104A and 1104B, respectively, illustrate the MGT value of a "new" engine and a "deteriorated" engine at its 2 minute OEI rating, points 1106A and 1106B, respectively, represent the MGT for a "new" engine and a "deteriorated" engine at its take-off power (or continuous OEI) rating, and points 1108A and 1108B, respectively, represent the MGT for a "new" engine and a "deteriorated" engine at its maximum continuous power (or continuous OEI) rating. What these curves demonstrate is that, a safe and effective threshold value can depend upon the current state of the engine, in addition to the power rating of the engine. Hence, in some embodiments contemplated herein, the current health of the Engine 1 (that is, the engine(s) that will remain in full operational mode during economy mode operation) will be compensated for when determining the nominal threshold value, or when adjusting the nominal threshold value upwards, as was discussed with reference to FIG. 10. Hence, in some embodiments, the amount of adjustment to the nominal threshold value will be increased or decreased, based upon a measured, or calculated, engine health value (such as the MGT-SHP relationship illustrated in FIG. 11). One skilled in the art will recognize that MGT is just one example of a measure or indicator of engine health. Other measures and/or indicators (e.g., the number of engine runtime hours, and the like) could likewise be used as an adjustment factor for the threshold value. Similarly, while maximum continuous power rating was described above as the threshold parameter, other parameters (OEI rating, maximum power, etc.) could likewise be employed.

In the above discussion, the nomenclature Engine 1 was used to describe an engine(s) that would remain in fully operational mode in economy mode and Engine 2 was used to describe an engine(s) that would be placed in REO mode during economy mode operation. This is not intended to imply that the same engine(s) is always placed in REO mode during economy mode operation. In a simplest two-engine embodiment, engine life can be balanced by a back-and-forth, alternating approach, where the first of the two engines (224A, for instance) is placed into REO mode during every odd instance of economy mode operation (the first time, third time, fifth time, etc.), and the second of the two engines (224B) is placed into REO mode during every even instance of economy mode operation (the second time, the fourth time, the sixth time, etc.). In a multi-engine configuration having more than two engines such as illustrated in FIG. 2B, for instance, a round robin approach may be employed (with each engine of the N total engines being selected for REO operation every Nth time the aircraft enters economy mode operation). In other embodiments, the decision regarding which engine(s) to place into REO mode can be based upon some engine-specific characteristic. As one example, the engine(s) having the greatest number of runtime hours could be selected for REO operation, or the engine(s) having the lowest "health" rating (such as MGT performance illustrated in FIG. 11) could be selected for REO operation. In some embodiments, in which engines having different ratings are utilized in the same aircraft, the decision may be premised upon the maximum continuous power, or other performance rating of the engines—with the engine having the best match to the current power requirements remaining active and the other engine(s) being selected for REO operation. Other approaches, including but not limited to selection based upon pilot input, pilot selection, or the like, will be apparent to those skilled in the art with routine experimentation, once informed by the present disclosure, and are within its contemplated scope.

The command to enter into economy mode can originate from different sources, including a live pilot, a remote pilot, a co-pilot, generated by a control law or other routine running in the fight control system, and the like. While these sources nominally work cooperatively, it must be recognized that circumstances might arise wherein conflicting inputs could be received from the different sources. For instance, a situation could arise wherein one pilot inputs a command to enter economy mode, whereas a co-pilot enters a command to disable economy mode. In another example, a pilot might select to enable economy mode, whereas the flight control system might select to inhibit economy mode. In some circumstances, this input from the flight control system could be premised upon the existence of a CWA message of which the pilot might not be aware, or might have consciously decided to disregard. In some contemplated embodiments, a pre-determined hierarchy of inputs is consulted by the flight control system to resolve a conflict. For instance, if one pilot is in the aircraft and another pilot is assisting form a remote location (and hence potentially not as aware of the full spectrum of flight conditions being experienced by the aircraft), the hierarchy rules would dictate that input from the local pilot be given precedence. Similarly, the hierarchy rules could dictate that input from a live pilot be given priority over input from the control laws and/or power consumption module 312, or the like. Under these circumstances, an appropriate verification could be employed-such as a warning light, or other pilot warning indicator—to alert the pilot to the existence of the conflicting inputs. In still other embodiments, the input that is most likely to result in safer flight conditions (presumably inhibiting economy mode) is always the input that is operated upon when conflicting inputs are received by the flight control system (unless, perhaps, specifically overruled by a live pilot).

In yet another embodiment, the decision of when and whether to enter into economy mode operation may be impacted by other or additional conditions beyond those described above. For instance, in some embodiments, the terrain conditions may also be evaluated and taken into account. As an example, an aircraft that is flying over flat terrain (such as a flat plain or over water) or an aircraft that is flying at a relatively high altitude, is unlikely to experience conditions where an abrupt increase in altitude is required; hence, under these conditions, operating in an economy mode with one (or more) engines in REO mode is safe. By contrast, an aircraft that is flying, at relatively low altitude, in mountainous terrain or over terrain having tall obstacles (trees, buildings, towers, etc.) is more likely to experience conditions where an abrupt or unexpected increase in altitude is necessary. In these conditions, the improved fuel consumption efficiency of economy mode might be outweighed by the need to ensure an appropriate safety window by keeping all engines in full operation mode. Hence, in some contemplated embodiments, sensors 340 (FIG. 3) include an above ground level (AGL) sensor, a pressure altitude sensor, and the like that contribute to the sensor data SD that is evaluated when determining the SHP power requirements. In some embodiments, the threshold value for entering into economy mode may be adjusted upwards to compensate for the terrain conditions. Alternatively, a terrain conditions factor may be added to the SHP valuation, such that the determined SHP value is increased beyond what would otherwise be calculated when terrain conditions are such that abrupt altitude increases are likely to occur.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. Additionally for the sake of brevity, various features and aspects that are explained herein with regard to one embodiment are not necessarily repeated with regard to another embodiment. It is nonetheless intended and within the contemplated scope of this disclosure that features of the individual embodiments can be combined together. It is therefore intended that the appended claims encompass any such modifications or embodiments.

What is claimed is:

1. A method for controlling a multi-engine aircraft capable of operating in an economy mode and a full operational mode, the method comprising:

calculating an engine shaft horsepower (SHP) requirement, based upon one or more sensed control values;

determining a current state of the aircraft;

in response to determining the aircraft is in the full operational mode, comparing the SHP requirement to a first threshold value, and allowing the aircraft to enter the economy mode of operation when the SHP requirement is below the first threshold value, and inhibiting the aircraft from entering the economy mode of operation when the SHP requirement is above the first threshold value;

in response to determining the aircraft is in the economy mode, comparing the SHP requirement to a second threshold value, and allowing the aircraft to remain in economy mode of operation when the SHP requirement is below the second threshold value, and inhibiting the aircraft from remaining in economy mode when the SHP requirement is above the second threshold value; and placing at least one engine of the aircraft in a reduced operation mode in response to the aircraft entering into the economy mode; and transitioning at least one engine of the aircraft from the reduced operation mode to a full operational mode in response to the aircraft being inhibited from remaining in the economy mode.

2. The method of claim 1, wherein the first threshold value is determined from a nominal threshold value, increased by a predetermined amount, and the second threshold value is determined from the nominal threshold value decreased by a second predetermined amount.

3. The method of claim 1, wherein the first threshold value and the second threshold value are the same value, and further comprising:
after the step of comparing the SHP requirement to a first threshold value, imposing a first time delay before allowing the aircraft to enter the economy mode of operation when the SHP requirement is below the first threshold value; and
after the step of comparing the SHP requirement to a second threshold value, imposing a second time delay before inhibiting the aircraft from remaining in economy mode when the SHP requirement is above the second threshold value.

4. The method of claim 1, further comprising activating a pilot indicator when allowing the aircraft to enter the economy mode of operation, and activating a pilot indicator when inhibiting the aircraft from remaining in economy mode of operation.

5. The method of claim 1, wherein the step of calculating an engine shaft horsepower (SHP) requirement, based upon one or more sensed control values, includes sensing a position of a collective control input device.

6. The method of claim 1, wherein the step of calculating an engine shaft horsepower (SHP) requirement, based upon one or more sensed control values, includes calculating the SHP based, at least in part, on the airspeed and gross weight of the aircraft.

7. The method of claim 6, further comprising:
determining an initial gross weight of the aircraft; and
updating the initial gross weight of the aircraft with a current gross weight based upon a rate of fuel consumption of the aircraft.

8. The method of claim 1, wherein the step of wherein the step of calculating an engine shaft horsepower (SHP) includes measuring engine torque and engine turbine output rotational speed being produced by the engine.

9. The method of claim 1, further comprising adjusting the SHP requirement, the first threshold value, or both based upon sensed terrain conditions.

10. An aircraft comprising:
a fuselage;
a propulsion assembly attached to the fuselage;
a power plant configured to drive the propulsion assembly, the power plant including at least two engines;
a plurality of sensors configured to provide sensor data;
a plurality of control surfaces configured to control a pitch, yaw, and roll of the aircraft;
a plurality of actuators configured to move respective control surfaces;
a plurality of control input devices configured to control respective actuators;
a flight control system configured to receive sensor data from the plurality of sensors and to receive actuator position data from the plurality of actuators, and configured to output power signals to the power plant, the power signals including respective power signals for respective ones of the at least two engines, and further including computer readable non-transitory memory containing instructions for the flight control system to:
calculate an engine shaft horsepower (SHP) requirement based, at least in part, on the sensor data;
determining a current operational mode of the aircraft;
in response to determining the aircraft is in a full operational mode, comparing the SHP requirement to a first threshold value, and allowing the aircraft to enter an economy mode of operation when the SHP requirement is below the first threshold value, and inhibiting the aircraft from entering the economy mode of operation when the SHP requirement is above the first threshold value;
in response to determining the aircraft is in the economy mode, comparing the SHP requirement to a second threshold value, and allowing the aircraft to remain in economy mode of operation when the SHP requirement is below the second threshold value, and inhibiting the economy mode when the SHP requirement is above the second threshold value; and
outputting a first power signal to place at least one engine of the aircraft in a reduced operation mode after entering into the economy mode; and
outputting a second power signal to transition at least one engine of the aircraft from the reduced operation mode to a full operational mode after inhibiting the economy mode of the aircraft.

11. The aircraft of claim 10, wherein the computer readable non-transitory memory includes instructions for the flight control system to inhibit economy mode if the aircraft is on the ground, if the airspeed is below a pre-determined threshold, if an FADEC CWA message is present, or if active mode is inhibited by a pilot.

12. The aircraft of claim 10, wherein the at least one engine is configured to respond to the first power signal by entering into an idle mode, a sub-idle mode, or an off mode.

13. The aircraft of claim 10, wherein the computer readable non-transitory memory contains instructions for the flight control system to calculate an engine shaft horsepower (SHP) requirement based on the sensor data and the actuator position data.

14. The aircraft of claim 10, wherein the first threshold value is determined from a nominal threshold value, increased by a predetermined amount, and the second threshold value is determined from the nominal threshold value decreased by a second predetermined amount.

15. The aircraft of claim 10, wherein the first threshold value and the second threshold value are the same value, and wherein the computer readable non-transitory memory further instructions of the flight control system to:
impose a first time delay before allowing the aircraft to enter the economy mode of operation when the SHP requirement is below the first threshold value; and
impose a second time delay before inhibiting the aircraft from remaining in economy mode when the SHP requirement is above the first threshold value.

16. The aircraft of claim 10, wherein the propulsion assembly comprises rotor blades.

17. A method of operating an aircraft, the method comprising:
determining a current operational state of the aircraft;
determining current flight conditions;
determining a shaft horse power (SHP) requirement corresponding to the current flight conditions;
comparing the SHP requirement to a threshold value;
when the current operation state is a full operational state, transitioning to an economy mode state if the SHP requirement is below a first threshold value, and remaining in the full operational state if the SHP requirement is above the threshold value, wherein at least one engine of the aircraft is placed in a reduced power mode in the economy mode state; and when the current operational state is an economy mode state, transitioning to a full operational state if the SHP requirement is above a second threshold value, and remaining in the economy mode state if the SHP requirement is below the threshold value, wherein the at least one engine is placed in a full operational mode in the full operational state.

18. The method of claim 17, wherein the first threshold value is a maximum continuous power rating value for the at least one engine, plus an adjustment factor.

19. The method of claim 17, wherein at least one of the first threshold value and the second threshold value is equal to the maximum continuous power rating for the at least one engine.

20. The method of claim 17, wherein the step of determining a shaft horse power (SHP) requirement corresponding to the current flight conditions includes determining the SHP from a look-up table.

* * * * *